United States Patent
Kato (10) Patent No.: US 10,612,597 B2
(45) Date of Patent: Apr. 7, 2020

(54) SEALING APPARATUS

(71) Applicant: NOK CORPORATION, Tokyo (JP)

(72) Inventor: Takuya Kato, Fukushima (JP)

(73) Assignee: NOK CORPORATION, Tokyo (JP)

( * ) Notice: Subject to any disclaimer, the term of this patent is extended or adjusted under 35 U.S.C. 154(b) by 35 days.

(21) Appl. No.: 15/915,720

(22) Filed: Mar. 8, 2018

(65) Prior Publication Data
US 2018/0195558 A1    Jul. 12, 2018

Related U.S. Application Data

(63) Continuation of application No. PCT/JP2016/077064, filed on Sep. 14, 2016.

(30) Foreign Application Priority Data

Oct. 9, 2015    (JP) .................... 2015-201365

(51) Int. Cl.
*F16J 15/32* (2016.01)
*F16C 33/80* (2006.01)
(Continued)

(52) U.S. Cl.
CPC .......... *F16C 33/805* (2013.01); *F16C 19/186* (2013.01); *F16C 33/7879* (2013.01);
(Continued)

(58) Field of Classification Search
CPC .... F16J 15/164; F16J 15/3232; F16J 15/3264; F16C 33/805; F16C 33/7879; F16C 19/186; F16C 2326/02
See application file for complete search history.

(56) References Cited

U.S. PATENT DOCUMENTS

2009/0206553 A1    8/2009 Kanzaki
2009/0322032 A1*   12/2009 Kanzaki ............... F16J 15/3264
                                                    277/351
(Continued)

FOREIGN PATENT DOCUMENTS

CN    101208550 A    6/2008
CN    102224351 A    10/2011
(Continued)

OTHER PUBLICATIONS

Extended European Search Report for Application No. 16853396.6, dated Apr. 23, 2019.
(Continued)

*Primary Examiner* — Gilbert Y Lee
(74) *Attorney, Agent, or Firm* — Pearne & Gordon LLP (57) ABSTRACT

A sealing apparatus includes a sealing apparatus body that is to be attached to an outer ring of a hub bearing, and a slinger that is to be attached to a hub, in which the sealing apparatus body includes a reinforcing ring and an elastic body part. The elastic body part includes an outer periphery side labyrinth lip that is positioned on an outer periphery side of an outer periphery side end portion of the slinger and forms a gap between the hub and the outer periphery side labyrinth lip, an inner periphery side labyrinth lip, and a side lip. A distal end portion of the outer periphery side labyrinth lip is positioned on the outer side of the outer periphery side end portion of the slinger in a direction of an axis, and the outer periphery side labyrinth lip forms a groove portion in an annular shape centered about the axis and depressed toward the inner periphery side at the outer periphery side labyrinth lip on the outer periphery side.

6 Claims, 4 Drawing Sheets

(51) Int. Cl.

| | | |
|---|---|---|
| *F16C 33/78* | (2006.01) | |
| *F16J 15/16* | (2006.01) | |
| *F16J 15/3232* | (2016.01) | |
| *F16J 15/3264* | (2016.01) | |
| *F16C 19/18* | (2006.01) | |

(52) U.S. Cl.
CPC ......... *F16J 15/164* (2013.01); *F16J 15/3232* (2013.01); *F16J 15/3264* (2013.01); *F16C 2326/02* (2013.01)

(56) References Cited

U.S. PATENT DOCUMENTS

| | | |
|---|---|---|
| 2011/0221140 A1 | 9/2011 | Nakagawa |
| 2013/0127119 A1 | 5/2013 | Haepp et al. |
| 2013/0241270 A1 | 9/2013 | Morita |
| 2014/0029883 A1* | 1/2014 | Sanaka ................ F16C 33/768 384/486 |
| 2015/0028663 A1 | 1/2015 | Seki et al. |
| 2015/0098670 A1 | 4/2015 | Gulli |
| 2015/0151573 A1 | 6/2015 | Shibayama |
| 2015/0151574 A1 | 6/2015 | Barberis et al. |
| 2016/0003302 A1* | 1/2016 | Seno ................... F16J 15/3264 277/351 |
| 2016/0003357 A1 | 1/2016 | Kanzaki |
| 2016/0131257 A1* | 5/2016 | Sakai .................... F16J 15/002 277/351 |
| 2018/0186181 A1* | 7/2018 | Tada .................... F16J 15/447 |

FOREIGN PATENT DOCUMENTS

| | | |
|---|---|---|
| CN | 103052819 A | 4/2013 |
| CN | 104220768 A | 12/2014 |
| CN | 104246323 A | 12/2014 |
| CN | 104675868 A | 6/2015 |
| CN | 104937318 A | 9/2015 |
| DE | 10 2008 017409 A1 | 10/2009 |
| FR | 3 018 321 A1 | 9/2015 |
| JP | 2009-085419 A | 4/2009 |
| JP | 2010-071323 A | 4/2010 |
| JP | 2014-240676 A | 12/2014 |
| JP | 2015-052350 A | 3/2015 |

OTHER PUBLICATIONS

Chinese Office action for Application No. 201680052522.3, dated Apr. 12, 2019.
English translation of the Written Opinion for corresponding International Application No. PCT/JP2016/077064 dated Oct. 25, 2016.
International Preliminary Report on Patentability for corresponding International Application No. PCT/JP2016/077064 dated Apr. 10, 2018.
International Search Report for corresponding International Application No. PCT/JP2016/077064 dated Oct. 25, 2016.
Written Opinion for corresponding International Application No. PCT/JP2016/077064 dated Oct. 25, 2016.
Notification of Reason for Refusal dated Apr. 2, 2019 for corresponding Korean Application No. 10-2018-7008967 and English translation.
Chinese Office Action dated Nov. 25, 2019 for corresponding Chinese Application No. 201680052522.3 and English translations.

* cited by examiner

SEALING APPARATUS

CROSS REFERENCE TO RELATED APPLICATIONS

The present application is a continuation application of International Application No. PCT/JP2016/077064, filed on Sep. 14, 2016, which claims priority to Japanese Patent Application No. 2015-201365, filed on Oct. 9, 2015. The contents of these applications are incorporated herein by reference in their entirety.

BACKGROUND

Technical Field

The present disclosure relates to a sealing apparatus, and particularly relates to a sealing apparatus used in a hub bearing of a vehicle or the like.

Background Art

In a vehicle, e.g., an automobile, a hub bearing that rotatably supports a wheel is placed in an environment directly exposed to foreign matter such as rainwater, muddy water, and dust. Thus, a sealing apparatus has been attached to the hub bearing to seal the inside of the hub bearing. The sealing apparatus is adapted to seal lubricant in the hub bearing and prevent the foreign matter from entering the inside of the hub bearing.

A sealing apparatus used in a hub bearing is required to prevent a torque resistance applied by the sealing apparatus to the hub bearing from being increased while preventing the foreign matter from entering the inside of the hub bearing.

Figure 4:
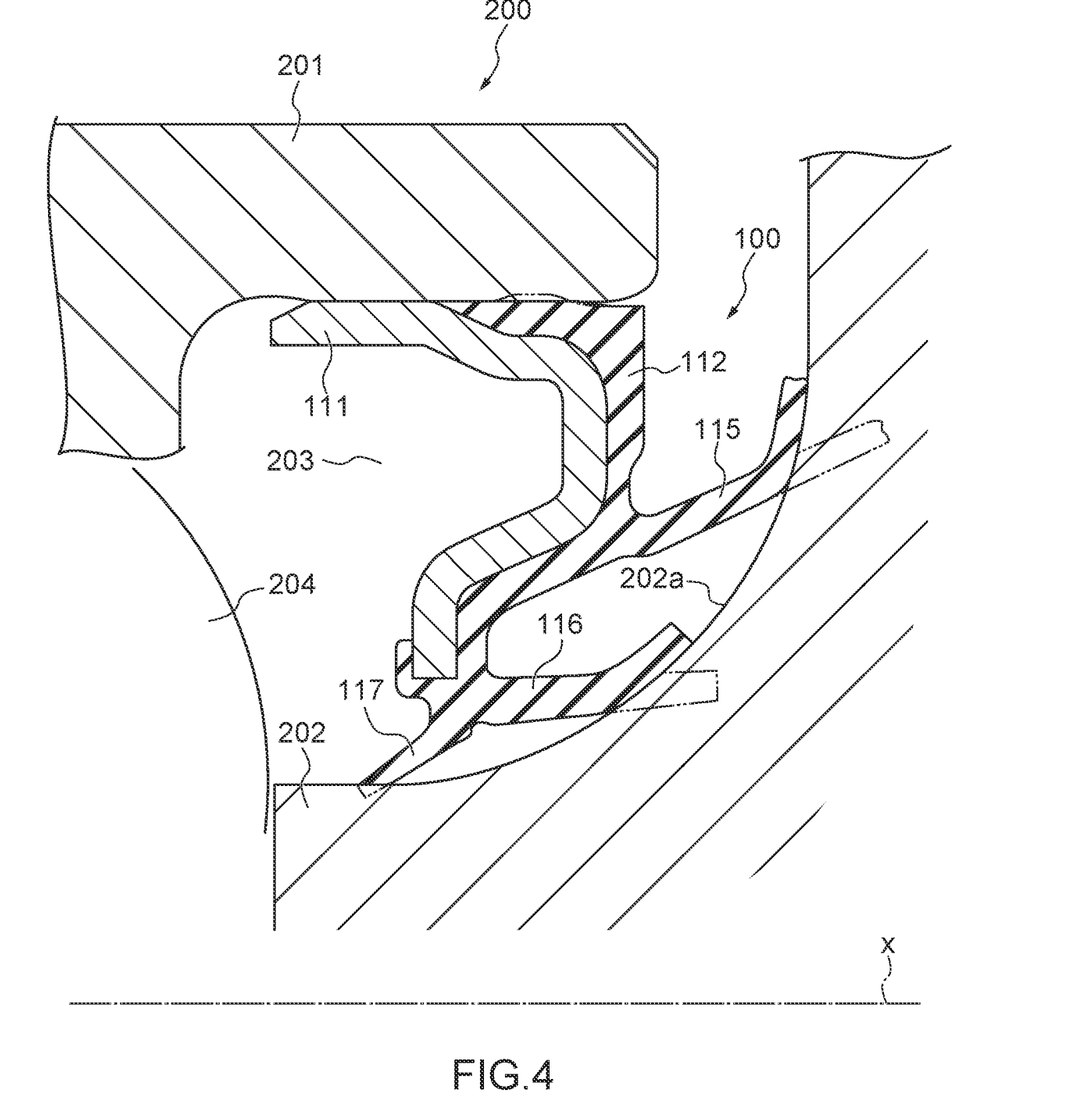
FIG. 4 is a cross-sectional view at a section along an axis, illustrating a conventional sealing apparatus.

FIG. 4 is a partial sectional diagram illustrating a schematic configuration of a conventional sealing apparatus attached to a hub bearing (hereinafter referred to as a "hub seal"). As illustrated in FIG. 4, in a hub bearing 200, a sealing apparatus 100 serving as a conventional hub seal is press-fitted between art outer ring 201 and a hub ring 202 to seal a space 203 in an annular shape between the outer ring 201 and the hub ring 202 that are mutually relatively rotated about the same axis. The sealing apparatus 100 is adapted to suppress leakage of lubricant of a rolling element 204 filled in the space 203 and suppress the foreign matter from entering the space 203.

As illustrated in FIG. 4, the sealing apparatus 100 includes a reinforcing ring 111 made of metal that is fitted to an inner peripheral surface of the outer ring 201 of the hub bearing 200, and an elastic body part 112 made of a rubber material that is integrally formed with the reinforcing ring 111 to cover the reinforcing ring 111.

In the sealing apparatus 100, the elastic body part 112 has side lips 115, 116, and a radial lip 117, and the side lips 115, 116 and the radial lip 117 are slidably brought into contact with a curved peripheral surface 202a of the hub ring 202. The side lips 115, 116 and the radial lip 117 are adapted to suppress the foreign matter from entering the space 203 of the hub bearing 200 (See Japanese Patent Application Laid-Open No. 2014-240676, for example).

In the conventional sealing apparatus 100 as illustrated in FIG. 4, the side lips 115, 116 and the radial lip 117 are adapted to prevent entrance of the foreign matter. However, there has been a demand for preventing entrance of the foreign matter in a more severe use environment in response to diversified use environments of the vehicle, and therefore the conventional sealing apparatus 100 must enhance the performance of preventing entrance of the foreign matter. To enhance the performance of preventing entrance of the foreign matter, it may be proposed that the side lips 115, 116 that are slidably brought into contact with the curved peripheral surface 202a of the hub ring 202 are increased, as is conventional. However, the side lips 115, 116 that prevent entering of the foreign matter by being slidably brought into contact with the curved peripheral surface 202a lead to increased torque resistance of the hub bearing 200.

The present disclosure is related to provide a sealing apparatus that can enhance a function of preventing entrance of foreign matter while avoiding an increase in generated torque resistance.

SUMMARY

A sealing apparatus according to the present disclosure is a sealing apparatus sealing between an outer periphery side member in an annular shape and an inner periphery side member in an annular shape that is at least partially surrounded by the outer periphery side member in a bearing, the outer periphery side member and the inner periphery side member being mutually relatively rotatable about an axis, the sealing apparatus comprises: a sealing apparatus body that is to be attached to the outer periphery side member; and a slinger in an annular shape centered about the axis that is to be attached to the inner periphery side member, the slinger being positioned outside of the sealing apparatus body. The sealing apparatus body comprises: a reinforcing ring in an annular shape centered about the axis; and an elastic body part in an annular shape centered about the axis, the elastic body being attached to the reinforcing ring and being formed from an elastic body. The elastic body part comprises: an outer periphery side labyrinth lip that extends through a portion on an outer periphery side of an outer periphery side end portion that is an end portion on the outer periphery side of the slinger, to form a gap between the inner periphery side member and the outer periphery side labyrinth lip; an inner periphery side labyrinth lip that is positioned on an inner periphery side of the outer periphery side labyrinth lip and forms a gap between the slinger and the inner periphery side labyrinth lip; and a side lip that is positioned on the inner periphery side of the labyrinth lips, and contacts the slinger. A distal end portion of the outer periphery side labyrinth lip is positioned on the outer side of the outer periphery side end portion of the slinger in a direction of the axis, and the outer periphery side labyrinth lip forms a groove portion in an annular shape centered about the axis and depressed toward the inner periphery side at the outer periphery side labyrinth lip on the outer periphery side.

In the sealing apparatus according to an aspect of the present disclosure, the elastic body part comprises a weir portion in an annular shape centered about the axis, the weir portion projecting toward the outer periphery side from an outer peripheral surface of the outer periphery side member, wherein the weir portion forms the groove portion between the outer periphery side labyrinth lip and the weir portion.

In the sealing apparatus according to an aspect of the present disclosure, the elastic body part at a part between the outer periphery side labyrinth lip and the inner periphery side labyrinth lip faces the slinger with a gap so as to form a labyrinth seal.

In the sealing apparatus according to an aspect of the present disclosure, at at least at a portion of the outer periphery side end portion on a distal end side, the slinger is spaced from the inner periphery side member in the direction of the axis so as to form a grooved gap portion in an annular shape centered about the axis, the grooved gap portion being depressed toward the inner periphery side.

According to a sealing apparatus of the present disclosure, a function of preventing entrance of foreign matter can be enhanced while avoiding an increase in generated torque resistance.

DETAILED DESCRIPTION

Hereinafter, embodiments of the present disclosure will be described with reference to the accompanying drawings. A sealing apparatus according to a first embodiment of the present disclosure will be described with reference to FIG. 1 and FIG. 2.

Figure 1:
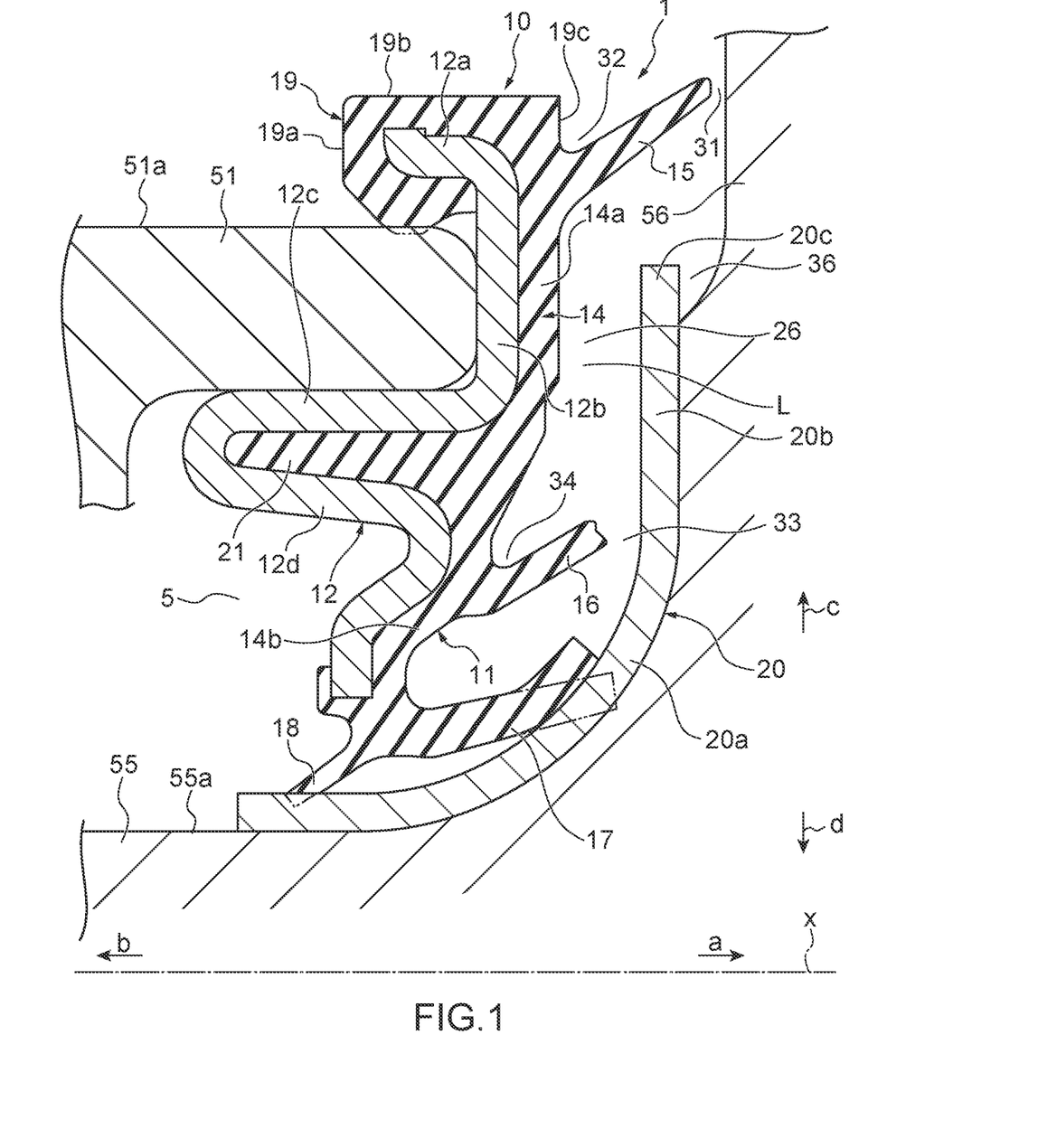
FIG. 1 is a cross-sectional view at a section along an axis of a sealing apparatus according to a first embodiment of the present disclosure.
Figure 2:
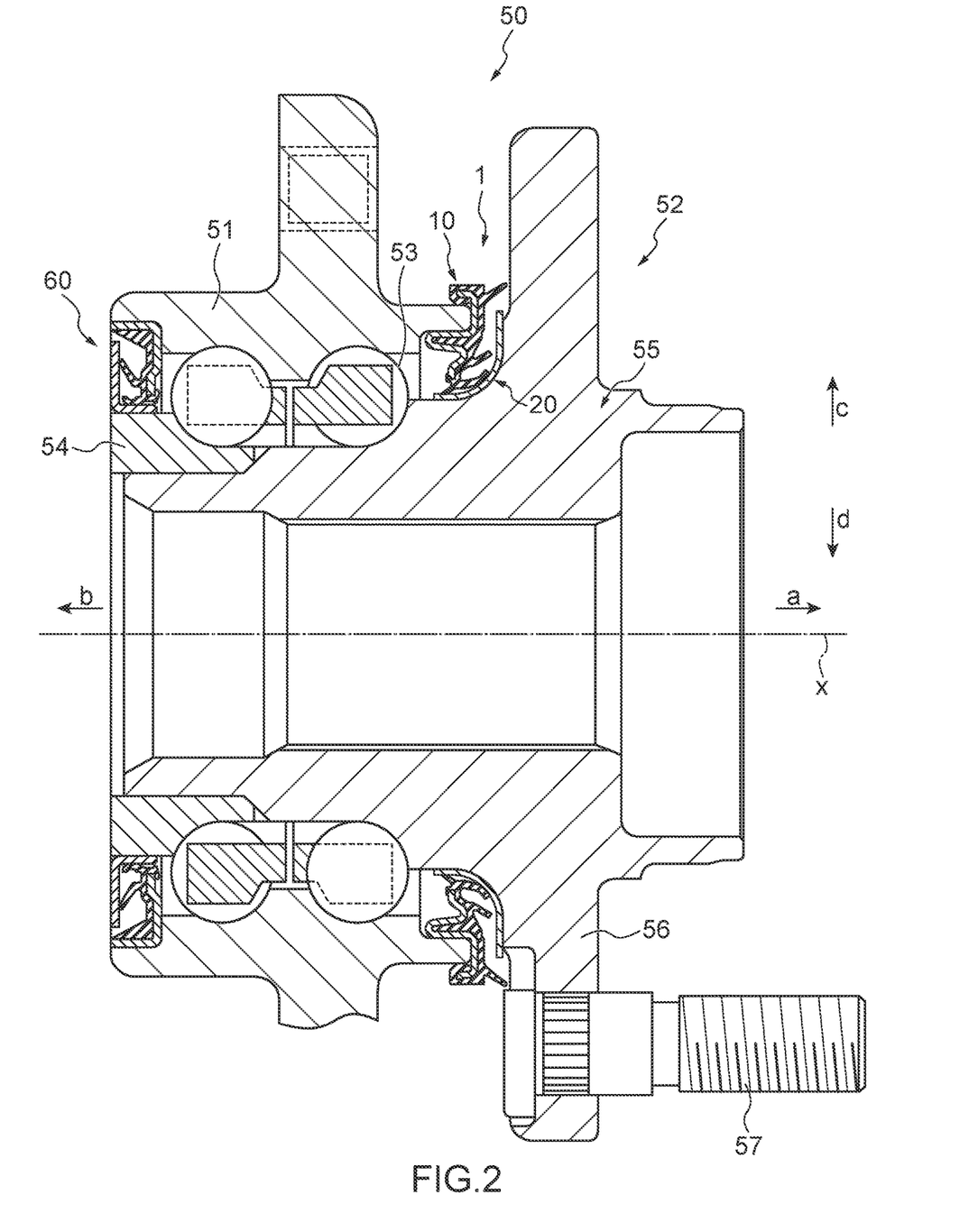
FIG. 2 is a cross-sectional view at a section along the axis for illustrating a state in which the sealing apparatus is attached to a hub bearing according to the first embodiment of the present disclosure.

FIG. 1 is a sectional diagram illustrating a schematic configuration of a sealing apparatus 1 according to the first embodiment of the present disclosure. FIG. 2 is a sectional diagram illustrating a state in which the sealing apparatus 1 according to the first embodiment of the present disclosure is attached to a hub bearing 50 that rotatably supports a wheel in an automobile, for example.

As illustrated in FIG. 2, the hub bearing 50 includes: an outer ring 51 in an annular shape centered about an axis x that serves as an outer periphery side member; a hub 52 in an annular shape centered about the axis x that serves as an inner periphery side member, is relatively rotatable with respect to the outer ring 51, and is partially surrounded by the outer 51; and a plurality of bearing balls 53 that are disposed between the outer ring 51 and the hub 52. Specifically, the hub 52 has an inner ring 54 and a hub ring 55, and a wheel (not illustrated) is mounted on a wheel mounting flange 56 of the hub ring 55 by a plurality of hub bolts 57.

The sealing apparatus 1 according to the first embodiment of the present disclosure is attached between the inner peripheral surface of the outer ring 51 of the hub bearing 50 and the outer peripheral surface of the hub ring 55 of the hub 52. Another sealing apparatus 60 is attached between the inner peripheral surface of the outer ring 51 and the outer peripheral surface of the inner ring 54 of the hub 52. Note that the sealing apparatus 1 according to the first embodiment of the present disclosure, instead of the other sealing apparatus 60, can be attached between the inner peripheral surface of the outer ring 51 and the outer peripheral surface of the inner ring 54.

At a space 5 between the outer ring 51 and the hub ring 55, the sealing apparatus 1 in an annular shape centered about the axis x is disposed to seal the space 5 of the hub bearing 50. The sealing apparatus 1 is adapted to prevent lubricant from leaking from a region where the bearing balls 53 and the like of the hub bearing 50 are provided, and to prevent foreign matter such as rainwater, muddy water, and dust from entering the region from an external side.

As illustrated in FIG. 1, the sealing apparatus 1 according to the first embodiment of the present disclosure includes: a sealing apparatus body 10 in an annular shape centered about the axis x; and a slinger 20 in an annular shape centered about the axis x. The slinger 20 is disposed outside of the sealing apparatus body 10 to face the sealing apparatus body 10.

The sealing apparatus body 10 includes: an elastic body part 11 made of an elastic body in an annular shape centered about the axis x; and a reinforcing ring 12 made of metal in an annular shape centered about the axis x.

The elastic body part 11 is integrally attached to the reinforcing ring 12. Examples of the elastic body of the elastic body part 11 include various rubber materials. Examples of the rubber materials include synthetic rubbers such as nitrile rubber (NBR), hydrogenated nitrile rubber (H-NBR), acrylic rubber (ACM), or fluorine rubber (FKM). Examples of the metal materials of the reinforcing ring 12 include stainless steel or SPCC (cold rolled steel sheet).

For convenience of description, as used herein, the term "outer side" refers to a direction of arrow a in a direction of the axis x, and the term "inner side" refers to a direction of arrow b in the direction of the axis x, as illustrated in FIG. 1. More specifically, the outer side refers to a side in a direction facing an external side of the hub bearing 50, or a side in a direction facing an atmospheric side where the foreign matter is present. The inner side refers to a side in a direction facing an interior side of the hub bearing 50, or a side in a direction facing the space 5. In addition, in a direction perpendicular to the axis x (hereinafter referred to as a "radial direction"), the term "outer periphery side" refers to a direction away from the axis x (direction of arrow c in FIG. 1), and the term "inner periphery side" refers to a direction approaching the axis x (direction of arrow d in FIG. 1).

As illustrated in FIG. 1, the elastic body part 11 includes: a base body portion 14; an outer periphery side labyrinth lip 15; an inner periphery side labyrinth lip 16; a side lip 17; a radial lip 18; a weir portion 19; and a flange portion 21. The base body portion 14 includes: an outer periphery side base body portion 14a that is a portion extending in the radial direction; and an inner periphery side base body portion 14b that is a portion extending inclinedly from the radial direction, and the base body portion 14 is a portion that extends in a substantially disc shape centered about the axis x to be formed in an annular shape. The outer periphery side labyrinth lip 15 is a lip portion that extends outwardly and toward the outer periphery side from the vicinity of an end portion on the outer periphery side of the base body portion 14 in the base body portion 14. A distal end portion of the outer periphery side labyrinth lip 15 extends so as to be positioned outside of an outer periphery side end portion 20c of the slinger 20 in the direction of the axis x, as described later. The inner periphery side labyrinth lip 16 is a lip portion that is positioned on the inner periphery side of the outer periphery side labyrinth lip 15, and extends outwardly and toward the outer periphery side from the base body portion 14. The side lip 17 is a lip portion that is positioned on the inner periphery side of the inner periphery side labyrinth lip 16, and extends outwardly and toward the outer periphery side from an end portion on the inner periphery side of the base body portion 14. The radial lip 18 is a lip portion that extends inwardly and toward the inner periphery side from the end portion on the inner periphery side of the base body portion 14. The weir portion 19 is a portion formed inwardly from the vicinity of the end portion on the outer periphery side of the base body portion 14 facing away from the outer periphery side labyrinth lip 15 in the base body portion 14. The flange portion 21 is a portion that extends inwardly from the base body portion 14 at a position on the inner periphery side of the weir portion 19. Each of the outer periphery side labyrinth lip 15, the inner periphery side labyrinth lip 16, the side lip 17, the radial lip 18, the weir portion 19, and the flange portion 21 is formed in an annular shape centered about the axis x.

The reinforcing ring 12 formed in an annular shape centered about the axis x includes: a cylindrical portion 12a in a cylindrical shape that is positioned at an end portion on the outer periphery side; a disc portion 12b in a disc shape that extends toward the inner periphery side from the cylindrical portion 12a; a cylindrical portion 12c in a cylindrical shape that extends inwardly from the inner periphery side end portion of the disc portion 12b; and a bent portion 12d that is bent from an inner side end portion of the cylindrical portion 12c, extends toward the outer periphery side, is further bent inwardly, and reaches an end portion on the inner periphery side, as illustrated in FIG. 1. The cylindrical portion 12c of the reinforcing ring 12 is fitted to the inner periphery side of the outer ring 51.

The elastic body part 11 is attached to the reinforcing ring 12 from the inner periphery side and the outside so that the elastic body part 11 is reinforced. Specifically, the base body portion 14 of the elastic body part 11 is attached to the disc portion 12b and the bent portion 12d of the reinforcing ring 12 from the inner periphery side, the weir portion 19 of the elastic body part 11 is attached to the cylindrical portion 12a of the reinforcing ring 12 to cover the cylindrical portion 12a, and the flange portion 21 of the elastic body part 11 is attached to the disc portion 12b and the bent portion 12d of the reinforcing ring 12 so as to be sandwiched between the disc portion 12b and the bent portion 12d. As illustrated in FIG. 1, an inner periphery side end portion on the inner periphery side of the bent portion 12d is covered with and buried in the elastic body part 11. A portion on the inner periphery side of the weir portion 19 of the elastic body part 11 forms a gasket portion that is fitted to the outer ring 51 in a portion on the inner periphery side of the cylindrical portion 12a of the reinforcing ring 12, so that the gasket portion is compressed between the outer peripheral surface of the outer ring 51 and the cylindrical portion 12a of the reinforcing ring 12 when the sealing apparatus body 10 is press-fitted into the outer ring 51, thus generating a force toward the inside in the radial direction.

The reinforcing ring 12 is manufactured by, for example, press working or forging, and the elastic body part 11 is molded with a mold by cross-linking (vulcanization). During the cross-linking molding, the reinforcing ring 12 is placed inside the mold, and then the elastic body part 11 is adhered to the reinforcing ring 12 by cross-linking bonding, and then the elastic body part 11 is integrally molded with the reinforcing ring 12.

The slinger 20 is a member made of metal, for example, stainless steel excellent in rust resistance, and formed in a plate-like annular shape centered about the axis x. The slinger 20 is attached to a curved peripheral surface 55a in the vicinity of the end portion (in the vicinity of a root) on the inner periphery side inside of the wheel mounting flange 56 of the hub ring 55. The curved peripheral surface 55a is, for example, a curved surface in a hyperbolic curve shape so as to be in close contact with the inner peripheral surface of the slinger 20. Specifically, the slinger 20 includes a curved surface portion 20a in an annular shape centered about the axis x that is formed in a shape along the curved peripheral surface 55a, and a disc portion 20b in a disc shape centered about the axis x that extends toward the outer periphery side along the curved peripheral surface 55a from the end portion on the outer periphery side of the curved surface portion 20a. Specifically, in the sealing apparatus 1 according to the first embodiment of the present disclosure, the curved surface portion 20a and the disc portion 20b of the slinger 20 are continuously formed from the inside to the outer periphery side along the curved peripheral surface 55a. Note that the curved peripheral surface 55a is changed from a surface in a cylindrical surface shape to a curved surface to form a surface in a disc shape that extends in the radial direction, as illustrated in FIG. 1.

As illustrated in FIG. 1, the outer periphery side labyrinth lip 15 of the sealing apparatus 1 extends through the outer periphery side of the end portion on the outer periphery side of the disc portion 20b (outer periphery side end portion 20c) of the slinger 20. Specifically, the outer periphery side labyrinth lip 15 extends through the outer periphery side of the outer periphery side end portion 20c beyond the outer periphery side end portion 20c so that a distal end portion of the outer periphery side labyrinth lip 15 is positioned outside the disc portion 20b of the slinger 20 in the direction of the axis x. The distal end portion of the outer periphery side labyrinth lip 15 forms a small gap 31 between the curved peripheral surface 55a of the hub ring 55 and the distal end portion of the outer periphery side labyrinth lip 15, and is positioned outside of the outer periphery side end portion 20c of the disc portion 20b of the slinger 20 in the direction of the axis x. Thus, the outer periphery side labyrinth lip 15 forms a labyrinth seal. The outer periphery side labyrinth lip 15 also forms a groove portion 32 in an annular shape centered about the axis x, the groove portion being depressed toward the inner periphery side on the outer periphery side of the outer periphery side labyrinth lip 15. Specifically, the distal end portion of the outer periphery side labyrinth lip 15 extends to face the curved peripheral surface 55a of the hub ring 55 with the above-described small gap 31 interposed. In addition, the outer periphery side labyrinth lip 15 forms a gap on the outer periphery side in the radial direction with respect to the outer periphery side end portion 20c of the disc portion 20b of the slinger 20 to cover the slinger 20 from the outer periphery side. The groove portion 32 captures and stores the foreign matter such as rainwater, muddy water and dust before the foreign matter passes through the gap 31, and the foreign matter captured and stored in the groove portion 32 falls down due to its own weight, so that the foreign matter captured and stored in the groove portion 32 can be discharged to an external side of the sealing apparatus 1. Note that when the sealing apparatus body 10 is rotated, the foreign matter captured and stored in the groove portion 32 can be discharged to the external side of the sealing apparatus 1 by an action of a centrifugal force generated by the rotation of the hub bearing 50.

The weir portion 19 projects toward the outer periphery side from the outer peripheral surface 51a of the outer ring 51, and is formed in an annular shape centered about the axis x. The weir portion 19 forms the above-described groove portion 32 between the outer periphery side labyrinth lip 15 and the weir portion 19. Specifically, an outer side surface 19c on the outer side of the weir portion 19 forms the groove portion 32 together with a surface on the outer periphery side of the outer periphery side labyrinth lip 15. An inner side surface 19a of the weir portion 19 serves as a bulwark when the foreign matter enters from the external side, thereby suppressing foreign matter from entering into the seating apparatus 1. The foreign matter that has entered beyond the inner side surface 19a of the weir portion 19 is captured and stored in the groove portion 32 from the outer peripheral surface 19b and the outer side surface 19c of the weir portion 19, and the foreign matter captured and stored in the groove portion 32 as described above falls down due to its own weight, and is discharged to the external side of the sealing apparatus 1.

The outer periphery side base body portion 14a that is a portion of the base body portion 14 of the elastic body part 11 and extends in the radial direction between the outer periphery side labyrinth lip 15 and the inner periphery side labyrinth lip 16 forms a gap 26 having a narrow width that extends in the radial direction between the outer periphery side base body portion 14a and the disc portion 20b of the slinger 20, and forms a labyrinth seal L in the gap 26. The outer periphery side base body portion 14a of the base body portion 14 is formed in a annular plate shape or a disc shape centered about the axis x as illustrated in FIG. 1, for example, to face the disc portion 20b of the slinger 20 with the gap 26 interposed in the surface on the outer side of the outer periphery side base body portion 14a.

The inner periphery side labyrinth lip 16 is positioned on the inner periphery side of the outer periphery side labyrinth lip 15, and forms a small gap 33 between the curved surface portion 20a of the slinger 20 and a distal end of the inner periphery side labyrinth lip 16, and forms a labyrinth seal. The inner periphery side labyrinth lip 16 forms a groove portion 34 in an annular shape centered about the axis x between the base body portion 14 and the inner periphery side labyrinth lip 16 of the elastic body part 11, the groove portion 34 being depressed toward the inner periphery side on the outer periphery side of the inner periphery side labyrinth lip 16. Some of the foreign matter reaching the inner periphery side labyrinth lip 16 through the labyrinth seal L is captured and stored in the groove portion 34, and the foreign matter captured and stored in the groove portion 34 falls down due to its own weight, and the foreign matter that has fallen down is discharged to the external side of the sealing apparatus 1 through the labyrinth seal L by centrifugal force generated by the rotation of the hub bearing 50 (slinger 20). Note that when the sealing apparatus body 10 is rotated, the foreign matter captured in the groove portion 34 can be discharged to the external side of the sealing apparatus 1 through the labyrinth seal L by centrifugal force generated by the rotation of the sealing apparatus body 10.

A distal end portion of the side lip 17 is brought into contact with a surface on an inner side of the curved surface portion 20a of the slinger 20 with a predetermined interference (contact width), to form a sealing portion. A distal end portion of the radial lip 18 is brought into contact with a surface on an outer periphery side of the curved surface portion 20a of the slinger 20 with a predetermined interference, to form a sealing portion. The foreign matter that has passed through the inner periphery side labyrinth lip 16 is suppressed from entering the space 5 by the side lip 17 and the radial lip 18.

As illustrated in FIG. 1, the curved peripheral surface 55a of the hub ring 55 is adapted to form a shape of a level difference expanded toward the outer side in the vicinity of the disc portion 20b so as to form a grooved gap portion 36 in an annular shape centered about the axis x between the disc portion 20b of the slinger 20 and the curved peripheral surface 55a, the grooved gap portion 36 being depressed toward the inner periphery side. More specifically, in the sealing apparatus 1 according to the first embodiment of the present disclosure, the slinger 20 forms the grooved gap portion 36 between the disc portion 20b and the curved peripheral surface 55a of the hub ring 55 by using a portion (level difference portion) of the shape expanded toward the outer side of the curved peripheral surface 55a of the hub ring 55. The foreign matter that has passed through and entered the gap 31 from the external side along the curved peripheral surface 55a is captured and stored in the grooved gap portion 36. The foreign matter captured and stored in the grooved gap portion 36 falls down due to its own weight, so that the foreign matter captured and stored in the grooved gap portion 36 can be discharged to the external side of the sealing apparatus 1. The foreign matter captured and stored in the grooved gap portion 36 and the foreign matter attached to the grooved gap portion 36 by falling down due to its own weight is discharged to the external side of the sealing apparatus 1 by centrifugal force generated by the rotation of the hub bearing 50 (slinger 20 and hub ring 55). Note that even when the slinger 20 is not rotated, the foreign matter captured and stored in the grooved gap portion 36 falls down due to its own weight, and is thereby capable of discharging the foreign matter captured and stored in the grooved gap portion 36 to the external side of the sealing apparatus 1.

Figure 3:
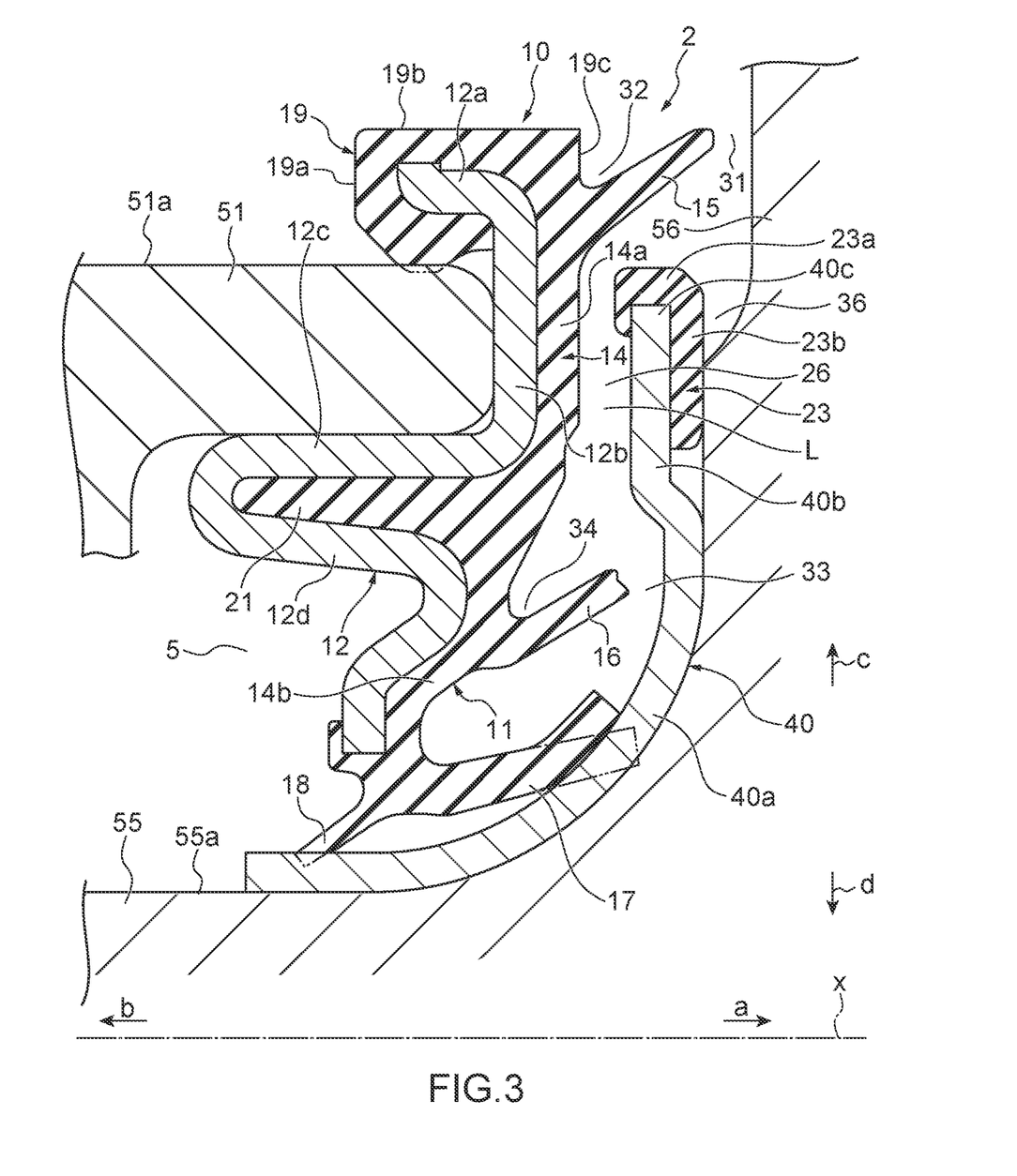
FIG. 3 is a cross-sectional view at a section along an axis of a sealing apparatus according to a second embodiment of the present disclosure.

A sealing apparatus 2 according to a second embodiment of the present disclosure will be described with reference to FIG. 3. FIG. 3 is a sectional diagram illustrating a schematic configuration of the sealing apparatus 2 according to the second embodiment of the present disclosure.

The sealing apparatus 2 according to the second embodiment of the present disclosure is applied to the hub bearing 50 illustrated in FIG. 2, similar to the sealing apparatus 1 according to the first embodiment of the present disclosure. The sealing apparatus 2 is attached between the inner peripheral surface of the outer ring 51 of the hub bearing 50 and the outer peripheral surface of the hub ring 55 of the hub 52. Another sealing apparatus 60 is attached between the inner peripheral surface of the outer ring 51 and the outer peripheral surface of the inner ring 54 of the hub 52. Note that the sealing apparatus 2 according to the second embodiment of the present disclosure, instead of the other sealing apparatus 60, can be attached between the inner peripheral surface of the outer ring 51 and the outer peripheral surface of the inner ring 54.

The sealing apparatus 2 in an annular shape centered about the axis x is disposed to seal a space 5 between the outer ring 51 and the hub ring 55 in the hub bearing 50. The sealing apparatus 2 is adapted to prevent lubricant from leaking from a region where the bearing balls 53 and the like of the hub bearing 50 are provided, and prevent foreign matter such as rainwater, muddy water, and dust from entering the region from the external side.

As illustrated in FIG. 3, the sealing apparatus 2 according to the second embodiment of the present disclosure includes: a sealing apparatus body 10 in an annular shape centered about the axis x; and a slinger 40 in an annular shape centered about the axis x. The slinger 40 is disposed outside of the sealing apparatus body 10 to face the sealing apparatus body 10.

The sealing apparatus body 10 includes: an elastic body part 11 made of an elastic body in an annular shape centered about the axis x; and a reinforcing ring 12 made of metal in annular shape centered about the axis x.

The elastic body part 11 is integrally attached to the reinforcing ring 12. Examples of the elastic body of the elastic body part 11 include various rubber materials. Examples of the rubber materials include synthetic rubbers such as nitrile rubber (NBR), hydrogenated nitrile rubber (H-NBR), acrylic rubber (ACM), or fluorine rubber (FKM).

Examples of the metal materials of the reinforcing ring 12 include stainless steel or SPCC (cold rolled steel sheet).

For convenience of description, as used herein, the term "outer side" refers to a direction of arrow a in a direction of the axis x, and the term "inner side" refers to a direction of arrow b in the direction of the axis x, as illustrated in FIG. 3. More specifically, the outer side refers to a side in a direction facing an external side of the hub bearing 50, or a side in a direction facing an atmospheric side where the foreign matter is present. The inner side refers to a side in a direction facing an interior side of the hub bearing 50, or a side in a direction facing the space 5. In addition, in a direction perpendicular to the axis x (hereinafter referred to as a "radial direction"), the term "outer periphery side" refers to a direction away from the axis x (direction of arrow c in FIG. 3), and the term "inner periphery side" refers to a direction approaching the axis x (direction of arrow d in FIG. 3).

As illustrated in FIG. 3, the elastic body part 11 includes: a base body portion 14; an outer periphery side labyrinth lip 15; an inner periphery side labyrinth lip 16; a side lip 17; a radial lip 18; a weir portion 19; and a flange portion 21. The base body portion 14 includes: an outer periphery side base body portion 14a that is a portion extending in the radial direction; and an inner periphery side base body portion 14b that is a portion extending inclinedly from the radial direction, and the base body portion 14 is a portion that extends in a substantially disc shape centered about the axis x to be formed in an annular shape. The outer periphery side labyrinth lip 15 is a lip portion that extends outwardly and toward the outer periphery side from the vicinity of an end portion on the outer periphery side of the base body portion 14 in the base body portion 14. The inner periphery side labyrinth lip 16 is a lip portion that is positioned on the inner periphery side of the outer periphery side labyrinth lip 15, and extends outwardly and toward the outer periphery side from the base body portion 14. The side lip 17 is a lip portion that is positioned on the inner periphery side of the inner periphery side labyrinth lip 16, and extends outwardly and toward the outer periphery side from an end portion on the inner periphery side of the base body portion 14. The radial lip 18 is a lip portion that extends inwardly and toward the inner periphery side from the end portion on the inner periphery side of the base body portion 14. The weir portion 19 is a portion formed inwardly from the vicinity of the end portion on the outer periphery side of the base body portion 14 and faces away from the outer periphery side labyrinth lip 15 in the base body portion 14. The flange portion 21 is a portion that extends inwardly from the base body portion 14 at a position on the inner periphery side of the weir portion 19. Each of the outer periphery side labyrinth lip 15, the inner periphery side labyrinth lip 16, the side lip 17, the radial lip 18, the weir portion 19, and the flange portion 21 is formed in an annular shape centered about the axis x.

The reinforcing ring 12 formed in an annular shape centered about the axis x includes: a cylindrical portion 12a in a cylindrical shape that is positioned at an end portion on the outer periphery side; a disc portion 12b in a disc shape that extends toward the inner periphery side from the cylindrical portion 12a; a cylindrical portion 12c in a cylindrical shape that extends inwardly from the inner periphery side end portion of the disc portion 12b; and a bent portion 12d that is bent from an inner side end portion of the cylindrical portion 12c, extends toward the outer periphery side, is further bent inwardly, and reaches an end portion on the inner periphery side, as illustrated in FIG. 3. The cylindrical portion 12c of the reinforcing ring 12 is fitted to the inner periphery side of the outer ring 51.

The elastic body part 11 is attached to the reinforcing ring 12 from the inner periphery side and the outside so that the elastic body part 11 is reinforced. Specifically, the base body portion 14 of the elastic body part 11 is attached to the disc portion 12b and the bent portion 12d of the reinforcing ring 12 from the inner periphery side, the weir portion 19 of the elastic body part 11 is attached to the cylindrical portion 12a of the reinforcing ring 12 to cover the cylindrical portion 12a, and the flange portion 21 of the elastic body part 11 is attached to the disc portion 12h and the bent portion 12d of the reinforcing ring 12 so as to be sandwiched between the disc portion 12b and the bent portion 12d. As illustrated in FIG. 3, an inner periphery side end portion on the inner periphery side of the bent portion 12d is covered with and buried in the elastic body part 11. A portion on the inner periphery side of the weir portion 19 of the elastic body part 11 forms a gasket portion that is fitted to the outer ring 51 in a portion on the inner periphery side of the cylindrical portion 12a of the reinforcing ring 12, so that the gasket portion is compressed between the outer peripheral surface of the outer ring 51 and the cylindrical portion 12a of the reinforcing ring 12 when the sealing apparatus body 10 is press-fitted into the outer ring 51, thus generating a force toward the inside in the radial direction.

The reinforcing ring 12 is manufactured by, for example, press working or forging, and the elastic body part 11 is molded with a mold by cross-linking (vulcanization). During the cross-linking molding, the reinforcing ring 12 is placed inside the mold, and then the elastic body part 11 is adhered to the reinforcing ring 12 by cross-linking bonding, and then, the elastic body part 11 is integrally molded with the reinforcing ring 12.

The slinger 40 is a member made of metal, for example, stainless steel excellent in rust resistance, and formed in a plate-like annular shape centered about the axis x. The slinger 40 is attached to a curved peripheral surface 55a in the vicinity of the end portion (in the vicinity of a root) on the inner periphery side inside of the wheel mounting flange 56 of the hub ring 55. The curved peripheral surface 55a is, for example, a curved surface in a hyperbolic curve shape so as to be in close contact with the inner peripheral surface of the slinger 40. Specifically, the slinger 40 includes a curved surface portion 40a in an annular shape centered about the axis x that is formed in a shape along the curved peripheral surface 55a, and a disc portion 40b in a disc shape centered about the axis x that is spaced from the curved peripheral surface 55a toward the inner side and extends toward the outer periphery side from the end portion on the outer periphery side of the curved surface portion 40a. Specifically, in the sealing apparatus 2, the disc portion 40b of the slinger 40 is provided with a gasket portion 23 made of an elastic body in an annular shape centered about the axis x to cover an end portion on the outer periphery side and the outer side of the disc portion 40b. The gasket portion 23 is adhered to the slinger 40 by cross-linking bonding, in the same manner as the above-described elastic body part 11. The gasket portion 23 includes: an outer peripheral end portion 23a that covers the end portion on the outer periphery side (outer periphery side end portion 40c) of the disc portion 40b; and an outer side portion 23b that covers an outer side of the disc portion 40b, and is in close contact with the curved peripheral surface 55a.

As illustrated in FIG. 3, the outer periphery side labyrinth lip 15 of the sealing apparatus 2 extends through a portion on the outer periphery side of the outer periphery side end portion 40c of the disc portion 40b of the slinger 40 and the outer peripheral end portion 23a of the gasket portion 23. The distal end portion of the outer periphery side labyrinth lip 15 forms a small gap 31 between the curved peripheral surface 55a of the hub ring 55 and the distal end portion of the outer periphery side labyrinth lip 15, and is positioned outside of the outer periphery side end portion 40c of the disc portion 40b of the slinger 40 in the direction of the axis x. Thus, the outer periphery side labyrinth lip 15 forms a labyrinth seal. The outer periphery side labyrinth lip 15 also forms a groove portion 32 in an annular shape centered about the axis x, the groove portion being depressed toward the inner periphery side on the outer periphery side of the outer periphery side labyrinth lip 15. Specifically, the distal end portion of the outer periphery side labyrinth lip 15 extends to face the curved peripheral surface 55a of the hub ring 55 with the above-described small gap 31 interposed. In addition, the outer periphery side labyrinth lip 15 forms a space on the outer periphery side in the radial direction with respect to the outer periphery side end portion 40c of the disc portion 40b of the slinger 40. The groove portion 32 captures and stores the foreign matter such as rainwater, muddy water and dust before the foreign matter passes through the gap 31, and the foreign matter captured and stored in the groove portion 32 falls down due to its own weight, so that the foreign matter captured and stored in the groove portion 32 can be discharged to an external side of the sealing apparatus 2. Note that when the sealing apparatus body 10 is rotated, the foreign matter captured and stored in the groove portion 32 can be discharged to the external side of the sealing apparatus 2 by centrifugal force generated by the rotation of the hub bearing 50.

The weir portion 19 projects toward the outer periphery side from the outer peripheral surface 51a of the outer ring 51, and is formed in an annular shape centered about the axis x. The weir portion 19 forms the above-described groove portion 32 between the outer periphery side labyrinth lip 15 and the weir portion 19. Specifically, an outer side surface 19c on the outer side of the weir portion 19 forms the groove portion 32 together with a surface on the outer periphery side of the outer periphery side labyrinth lip 15. An inner side surface 19a of the weir portion 19 serves as a bulwark when the foreign matter enters from the external side, thereby suppressing foreign matter from entering into the sealing apparatus 2. The foreign matter that has entered beyond the inner side surface 19a of the weir portion 19 is captured and stored in the groove portion 32 from on the outer peripheral surface 19b and the outer side surface 19c of the weir portion 19, and the foreign matter captured and stored in the groove portion 32 as described above falls down due to its own weight, and is discharged to the external side of the sealing apparatus 2.

The outer periphery side base body portion 14a that is a portion of the base body portion 14 of the elastic body part 11 and extends in the radial direction between the outer periphery side labyrinth lip 15 and the inner periphery side labyrinth lip 16 forms a gap 26 having a narrow width that extends in the radial direction between the outer periphery side base body portion 14a and the disc portion 40b of the slinger 40, and forms a labyrinth seal L in the gap 26. The outer periphery side base body portion 14a of the base body portion 14 is formed in a annular plate shape or a disc shape centered about the axis x as illustrated in FIG. 3, for example, to face the disc portion 40b of the slinger 40 with the gap 26 interposed in the surface on the outer side of the outer periphery side base body portion 14a.

The inner periphery side labyrinth lip 16 is positioned on the inner periphery side of the outer periphery side labyrinth lip 15, and forms a small gap 33 between the curved surface portion 40a of the slinger 40 and a distal end of the inner periphery side labyrinth lip 16, and forms a labyrinth seal. The inner periphery side labyrinth lip 16 forms a groove portion 34 in an annular shape centered about the axis x between the base body portion 14 and the inner periphery side labyrinth lip 16 of the elastic body part 11, the groove portion 34 being depressed toward the inner periphery side on the outer periphery side of the inner periphery side labyrinth lip 16. Some of the foreign matter reaching the inner periphery side labyrinth lip 16 through the labyrinth seal L is captured and stored in the groove portion 34, and the foreign matter captured and stored in the groove portion 34 falls down due to its own weight, and the foreign matter that has fallen downwardly is discharged to the external side of the sealing apparatus 2 through the labyrinth seal L by centrifugal force generated by the rotation of the hub bearing 50 (slinger 40). Note that when the sealing apparatus body 10 is rotated, the foreign matter captured in the groove portion 34 can be discharged to the external side of the sealing apparatus 2 through the labyrinth seal L by centrifugal force generated by the rotation of the sealing apparatus body 10.

A distal end portion of the side lip 17 is brought into contact with a surface on an inner side of the curved surface portion 40a of the slinger 40 with a predetermined interference (contact width), to form a sealing portion. A distal end portion of the radial lip 18 is brought into contact with a surface on an outer periphery side of the curved surface portion 40a of the slinger 40 with a predetermined interference to form a sealing portion. The foreign matter that has passed through the inner periphery side labyrinth lip 16 is suppressed from entering the space 5 by the side lip 17 and the radial lip 18.

As illustrated in FIG. 3, the disc portion 40b of the slinger 40 is formed to be displaced inwardly at a portion connected from the curved surface portion 40a. The curved peripheral surface 55a of the hub ring 55 is formed in a shape expanded outwardly in the vicinity of the disc portion 40b. Specifically, in the sealing apparatus 2, the slinger 40 includes the disc portion 40b that is displaced inwardly with respect to the curved surface portion 40a, and the curved peripheral surface 55a of the hub ring 55 includes a portion of the shape expanded outwardly (level difference portion). As a result, the disc portion 40b of the slinger 40 is positioned spaced from the curved peripheral surface 55a. The gasket portion 23 that covers the outer periphery side end portion 40c of the disc portion 40b forms a grooved gap portion 36 in an annular shape centered about the axis x between the outer side portion 23b of the gasket portion 23 and the curved peripheral surface 55a facing the outer side portion 23b, the grooved gap portion 36 being depressed toward the inner periphery side. The foreign matter that has passed through and entered the gap 31 from the external side along on the curved peripheral surface 55a is captured and stored in the grooved gap portion 36. The foreign matter captured and stored in the grooved gap portion 36 falls down due to its own weight, so that the foreign matter captured and stored in the grooved gap portion 36 can be discharged to the external side of the sealing apparatus 2. The foreign matter captured and stored in the grooved gap portion 36 and the foreign matter attached to the grooved gap portion 36 by falling down due to its own weight is discharged to the external side of the sealing apparatus 2 by an action of a centrifugal force generated by the rotation of the hub bearing 50 (slinger 40 and hub ring 55). Note that even when the slinger 40 is not rotated, the foreign matter captured and stored in the grooved gap portion 36 falls down due to its own weight, thereby being capable of discharging the foreign matter captured and stored in the grooved gap portion 36 to the external side of the sealing apparatus 2.

Note that to form the grooved gap portion 36, the slinger 40 does not need to include the disc portion 40b that is displaced inwardly with respect to the curved surface portion 40a, and the curved peripheral surface 55a of the hub ring 55 does not need to include the portion in a shape expanded toward the outer side of the curved peripheral surface 55a of the hub ring 55 like in the case illustrated in FIG. 3. For example, even when the curved peripheral surface 55a of the hub ring 55 is smoothly and continuously formed without the portion in a shape expanded toward the outer side of the curved peripheral surface 55a, the grooved gap portion 36 can be formed between the curved peripheral surface 55a and the disc portion 40b by forming the slinger 40 so as to include the disc portion 40b that is displaced inwardly with respect to the curved surface portion 40a. When the curved peripheral surface 55a of the hub ring 55 includes a portion in a shape expanded outwardly in the vicinity of a position on which the sealing apparatus 2 is mounted, the grooved gap portion 36 can be formed by slinger 40 between the curved surface portion 40a of the slinger 40 and the curved peripheral surface 55a of the hub ring 55 by using the portion in a shape expanded outwardly in the curved peripheral surface 55a of the hub ring 55 even when the slinger 40 includes only the curved surface portion 40a and does not include the disc portion 40b. Note that the same may apply to the sealing apparatus 1 illustrated in FIG. 1.

In the sealing apparatus 1, 2 according to the embodiment of the present disclosure, the outer periphery side labyrinth lip 15 extends through a portion on the outer periphery side of the outer periphery side end portion 20c of the disc portion 20b of the slinger 20, or through a portion on the outer periphery side of the outer periphery side end portion 40c of the disc portion 40b of the slinger 40 and the outer peripheral end portion 23a of the gasket portion 23, and the distal end of the outer periphery side labyrinth lip 15 is positioned outside on the outer periphery side end portion 20c, 40c of the disc portion 20b, 40b of the slinger 20, 40 in the direction of the axis x, thus the small gap 31 can be formed between the curved peripheral surface 55a of the hub ring 55 and the outer periphery side labyrinth lip 15, thereby forming the labyrinth seal. Therefore, the small gap 31 can make it difficult for foreign matter to enter, and the outer periphery side labyrinth lip 15 enhances a function of preventing entrance of the foreign matter while avoiding an increase in generated torque resistance. The outer periphery side labyrinth lip 15 covers, from the outer periphery side, the gap 26 between the disc portion 20b, 40b of the slinger 20, 40 and the outer periphery side base body portion 14a of the base body portion 14, and is thereby capable of further enhancing the function of preventing entrance of the foreign matter.

The groove portion 32 is formed on the outer periphery side of the outer periphery side labyrinth lip 15, and is thereby capable of capturing and storing the foreign matter in the groove portion 32 before the foreign matter enters the gap 31. The foreign matter captured and stored in the groove portion 32 falls down due to its own weight, and is thereby capable of being discharged to the external side of the sealing apparatus 1, 2.

The weir portion 19 is formed to project toward the outer periphery side from the outer peripheral surface 51a of the outer ring 51, so that the inner side surface 19a of the weir portion 19 can serve as a bulwark when the foreign matter enters from the external side, thereby being capable of suppressing foreign matter from entering into the sealing apparatus 1, 2.

The outer side surface 19c on the outer side of the weir portion 19 forms the groove portion 32 together with the surface on the outer periphery side of the outer periphery side labyrinth lip 15. Therefore, the foreign matter that has entered beyond the inner side surface 19a of the weir portion 19 is captured and stored in the groove portion 32 from on the outer peripheral surface 19b and the outer side surface 19c of the weir portion 19, and the foreign matter captured and stored in the groove portion 32 falls down due to its own weight, and is thereby capable of being discharged to the external side of the sealing apparatus 1, 2.

The outer periphery side base body portion 14a of the base body portion 14 forms the labyrinth seal L in the gap 26, and therefore the flow resistance of the foreign matter is increased, and is thereby capable of suppressing the foreign matter from entering the space 5.

The outer periphery side end portion 20c of the disc portion 20b of the slinger 20 or the gasket portion 23 that covers the outer periphery side end portion 40c of the disc portion 40b of the slinger 40 forms the grooved gap portion 36 in an annular shape centered about the axis x between the outer periphery side end portion 20c or the gasket portion 23 and the curved peripheral surface 55a of the hub ring 55 facing the outer periphery side end portion 20c of the disc portion 20b of the slinger 20 or the outer side portion 23b of the gasket portion 23, the grooved gap portion 36 being depressed toward the inner periphery side, and therefore the foreign matter that has passed through the gap 31 from the external side along the curved peripheral surface 55a is captured and stored in the grooved gap portion 36. The foreign matter captured and stored in the grooved gap portion 36 falls down due to its own weight, so that the foreign matter captured and stored in the grooved gap portion 36 can be discharged to the external side of the sealing apparatus 1, 2, and is thereby capable of being discharged to the external side of the sealing apparatus 1, 2 by centrifugal force generated by the rotation of the hub bearing 50.

The inner periphery side labyrinth lip 16 forms the groove portion 34 in an annular shape centered about the axis x between the base body portion 14 and the inner periphery side labyrinth lip 16 of the elastic body part 11, the groove portion being depressed toward the inner periphery side, so that the foreign matter is captured and stored in the groove portion 34. The foreign matter captured aid stored in the groove portion 34 fall downwardly, so that the foreign matter that has fallen downwardly can be discharged to the external side of the sealing apparatus 1, 2 by centrifugal force generated by the rotation of the hub bearing 50. The inner periphery side labyrinth lip 16 forms the small gap 33 between the inner periphery side labyrinth lip 16 and the curved surface portion 20a, 40a of the slinger 20, 40, and forms a labyrinth seal, so that the small gap 33 can make it difficult for foreign matter to enter.

Hereinbefore, the preferable embodiments of the present disclosure have been described, but the present disclosure is not limited to the sealing apparatus 1, 2 according to the above embodiments of the present disclosure and may include all aspects included in the concept of the present disclosure and the scope of the claims. Further, the above components may be combined appropriately and selectively to solve at least a part of the above problems and to exert at least a part of the above effects. For example, the shape, material, arrangement, size, and the like of each component in the above embodiments can be appropriately changed according to a specific application of the present disclosure.

What is claimed is:

1. A sealing apparatus sealing between art outer periphery side member in an annular shape and an inner periphery side member in an annular shape that is at least partially surrounded by the outer periphery side member in a bearing, the outer periphery side member and the inner periphery side member being mutually relatively rotatable about an axis, the sealing apparatus comprising:
   a sealing apparatus body that is to be attached to the outer periphery side member; and
   a slinger in an annular shape centered about the axis that is to be attached to the inner periphery side member, the slinger being positioned outside of the sealing apparatus body, wherein
   the sealing apparatus body comprises: a reinforcing ring in an annular shape centered about the axis; and an elastic body part in an annular shape centered about the axis, the elastic body part being attached to the reinforcing ring and being formed from an elastic body,
   the elastic body part comprises: an outer periphery side labyrinth lip that extends through a portion on an outer periphery side of an outer periphery side end portion that is an end portion on the outer periphery side of the slinger, to form a gap between the inner periphery side member and the outer periphery side labyrinth lip; an inner periphery side labyrinth lip that is positioned on an inner periphery side of the outer periphery side labyrinth lip and forms a gap between the slinger and the inner periphery side labyrinth lip; and a side lip that is positioned on the inner periphery side of the labyrinth lips, and contacts the slinger, and a distal end portion of the outer periphery side labyrinth lip is positioned on the outer side of the outer periphery side end portion of the slinger in a direction of the axis, and the outer periphery side labyrinth lip forms a groove portion in an annular shape centered about the axis and depressed toward the inner periphery side at the outer periphery side labyrinth lip on the outer periphery side, wherein the groove portion includes a surface that faces the inner periphery side member.

2. The sealing apparatus according to claim 1, wherein the elastic body part comprises a weir portion in an annular shape centered about the axis, the weir portion projecting toward the outer periphery side from an outer peripheral surface of the outer periphery side member, wherein the weir portion forms the groove portion between the outer periphery side labyrinth lip and the weir portion.

3. The sealing apparatus according to claim 1, wherein the elastic body part at a part between the outer periphery side labyrinth lip and the inner periphery side labyrinth lip faces the slinger with a gap so as to form a labyrinth seal.

4. The sealing apparatus according to claim 1, wherein, at least at a portion of the outer periphery side end portion on a distal end side, the slinger is spaced from the inner periphery side member in the direction of the axis so as to form a grooved gap portion in an annular shape centered about the axis, the grooved gap portion being depressed toward the inner periphery side.

5. The sealing apparatus according to claim 1, wherein the outer periphery side labyrinth lip extends further in an axial direction, towards an outer side of the inner periphery side member, than the slinger.

6. The sealing apparatus according to claim 1, wherein the groove portion is disposed further in an axial direction, towards the inner periphery side member, than the reinforcing ring.

* * * * *

UNITED STATES PATENT AND TRADEMARK OFFICE
CERTIFICATE OF CORRECTION

PATENT NO. : 10,612,597 B2
APPLICATION NO. : 15/915720
DATED : April 7, 2020
INVENTOR(S) : Takuya Kato It is certified that error appears in the above-identified patent and that said Letters Patent is hereby corrected as shown below:

In the Claims

Column 1, Line 37, "huh" should read -- hub --;

Column 1, Line 40, "art" should read -- an --;

Column 10, Line 12, "12h" should read -- 12b --; and

Column 14, Line 52, "aid" should read -- and --.

Signed and Sealed this
Seventh Day of July, 2020

Andrei Iancu
*Director of the United States Patent and Trademark Office*